United States Patent
Ning et al.

(10) Patent No.: US 10,474,688 B2
(45) Date of Patent: Nov. 12, 2019

(54) SYSTEM AND METHOD TO RECOMMEND A BUNDLE OF ITEMS BASED ON ITEM/USER TAGGING AND CO-INSTALL GRAPH

(71) Applicant: Google LLC, Mountain View, CA (US)

(72) Inventors: Huazhong Ning, San Jose, CA (US); Wei Chai, Cupertino, CA (US); Hrishikesh Aradhye, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 279 days.

(21) Appl. No.: 15/727,384

(22) Filed: Oct. 6, 2017

(65) Prior Publication Data

US 2018/0129664 A1 May 10, 2018

Related U.S. Application Data

(63) Continuation of application No. 14/529,580, filed on Oct. 31, 2014, now abandoned.

(51) Int. Cl.
| | |
|---|---|
| G06F 17/30 | (2006.01) |
| G06F 16/2457 | (2019.01) |
| G06N 7/00 | (2006.01) |
| G06F 16/954 | (2019.01) |

(52) U.S. Cl.
CPC ...... *G06F 16/24578* (2019.01); *G06F 16/954* (2019.01); *G06N 7/005* (2013.01)

(58) Field of Classification Search
CPC . G06F 16/24578; G06F 16/954; G06N 7/005; G06N 5/022; G06Q 30/0631
See application file for complete search history.

(56) References Cited

U.S. PATENT DOCUMENTS

| | | |
|---|---|---|
| 7,720,720 B1 | 5/2010 | Sharma et al. |
| 7,743,059 B2 | 6/2010 | Chan et al. |
| 8,090,621 B1 | 1/2012 | Chakrabarti et al. |
| 8,396,759 B2 | 3/2013 | Mehta et al. |
| 8,452,797 B1 | 5/2013 | Paleja et al. |
| 8,468,164 B1 | 6/2013 | Paleja et al. |
| 8,484,636 B2 | 7/2013 | Mehta et al. |
| 8,620,764 B2 | 12/2013 | Moritz et al. |
| 9,224,105 B2 | 12/2015 | Cornelius et al. |

(Continued)

OTHER PUBLICATIONS

Bhandari Upasna et al: "Serendipitous Recommendation for Mobile Apps Using Item-Item Similarity Graph", Dec. 9, 2013 (Dec. 9, 2013), Correct System Design; [Lecture Notes in Computer Science; Lect. Notes Computer], Springer International Publishing, Cham, pp. 440-451.

(Continued)

*Primary Examiner* — Greta L Robinson
(74) *Attorney, Agent, or Firm* — Shumaker & Sieffert, P.A.

(57) ABSTRACT

A system and method of recommending a bundle of content items to a user, including storing a plurality of content items in a computer system, determining a respective co-selection score for each pair of content items among the plurality of content items, the co-selection score indicating a probability that a given pair of content items among the plurality of content items will both be downloaded by a user of the computer system, and outputting, to a first user, a plurality of content items comprising a sub-set of the plurality of content items.

20 Claims, 6 Drawing Sheets

(56) References Cited

U.S. PATENT DOCUMENTS

| | | | |
|---|---|---|---|
| 9,274,816 | B2 | 3/2016 | Muttik |
| 9,326,026 | B2* | 4/2016 | Ramakrishnan ........ H04W 4/70 |
| 9,330,411 | B2* | 5/2016 | Zhou .................. H04N 21/4668 |
| 10,289,623 | B2* | 5/2019 | Ye ............................. G06N 5/00 |
| 2005/0234875 | A1 | 10/2005 | Auerbach et al. |
| 2008/0270398 | A1 | 10/2008 | Landu et al. |
| 2013/0024464 | A1 | 1/2013 | Berner et al. |
| 2013/0085886 | A1 | 4/2013 | Satish et al. |
| 2013/0151536 | A1* | 6/2013 | Akoglu ............... G06F 16/2246 |
| | | | 707/748 |
| 2013/0185292 | A1* | 7/2013 | Li ........................ G06F 21/577 |
| | | | 707/723 |
| 2014/0046965 | A1 | 2/2014 | Tian et al. |
| 2014/0188866 | A1 | 7/2014 | Wu et al. |

OTHER PUBLICATIONS

Fouss et al., A Novel Way of Computing Similarities Between Nodes of a Graph with Application to Collaborative Recommendation, Year: 2005, pp. 550-556.

Hengshu Zhu et al: "Mobile app recommendations with security and privacy awareness ", Knowledge Discovery and Data Mining, ACM, 2 Penn Plaza, Suite 701 New York NY 10121-0701 USA, Aug. 24, 2014 (Aug. 24, 2014), pp. 951-960.

International Search Report and Written Opinion dated Mar. 3, 2016 as received in Application No. PCT/US2015/057618.

IPRP dated May 11, 2017 as received in Application No. PCT/US2015/057618.

Prosecution History from U.S. Appl. No. 14/529,580, dated Sep. 30, 2016 through Aug. 7, 2017, 51 pp.

\* cited by examiner

SYSTEM AND METHOD TO RECOMMEND A BUNDLE OF ITEMS BASED ON ITEM/USER TAGGING AND CO-INSTALL GRAPH

BACKGROUND

Various systems for managing, selling and searching for digital media content and/or applications exist. Such systems typically include user account functions and tracking functions designed to record download decisions of users of the system. Based on a user's past decisions, such systems may recommend digital media content and/or applications to the user which are deemed to be of potential interest to the user.

BRIEF SUMMARY

According to an embodiment of the disclosed subject matter, a computer-based processor may be employed to execute computer executable components stored in a memory to perform: storing a plurality of content items in a computer system, determining a respective co-selection score for each pair of content items among the plurality of content items, the co-selection score indicating a probability that a given pair of content items among the plurality of content items will both be downloaded by a user of the computer system, and outputting, to a first user, a plurality of content items comprising a sub-set of the plurality of content items, the sub-set being selected to correspond to a graph having vertices each connected by unique edges, wherein each vertex corresponds to a content item and each unique edge corresponds to a co-selection score greater than a predetermined threshold value.

According to an embodiment of the disclosed subject matter, a system may include a storage device, a memory that stores computer executable components, and a processor that executes computer executable components stored in the memory, including a storage component that stores a plurality of content items in the storage device, a calculating component that determines a respective co-selection score for each pair of content items among the stored plurality of content items, the co-selection score indicating a probability that a given pair of content items among the plurality of content items will both be downloaded by a user of the system, an output component that outputs, to a first user, a plurality of content items comprising a sub-set of the stored plurality of content items, and a processing component that selects the sub-set such that the sub-set corresponds to a graph having vertices each connected by unique edges, wherein each vertex corresponds to a content item and each unique edge corresponds to a co-selection score greater than a predetermined threshold value.

According to an embodiment of the disclosed subject matter, means for storing a plurality of content items in a computer system, means for determining a respective co-selection score for each pair of content items among the plurality of content items, the co-selection score indicating a probability that a given pair of content items among the plurality of content items will both be downloaded by a user of the computer system, and means for outputting, to a first user, a plurality of content items comprising a sub-set of the plurality of content items, the sub-set being selected to correspond to a graph having vertices each connected by unique edges, wherein each vertex corresponds to a content item and each unique edge corresponds to a co-selection score greater than a predetermined threshold value, are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
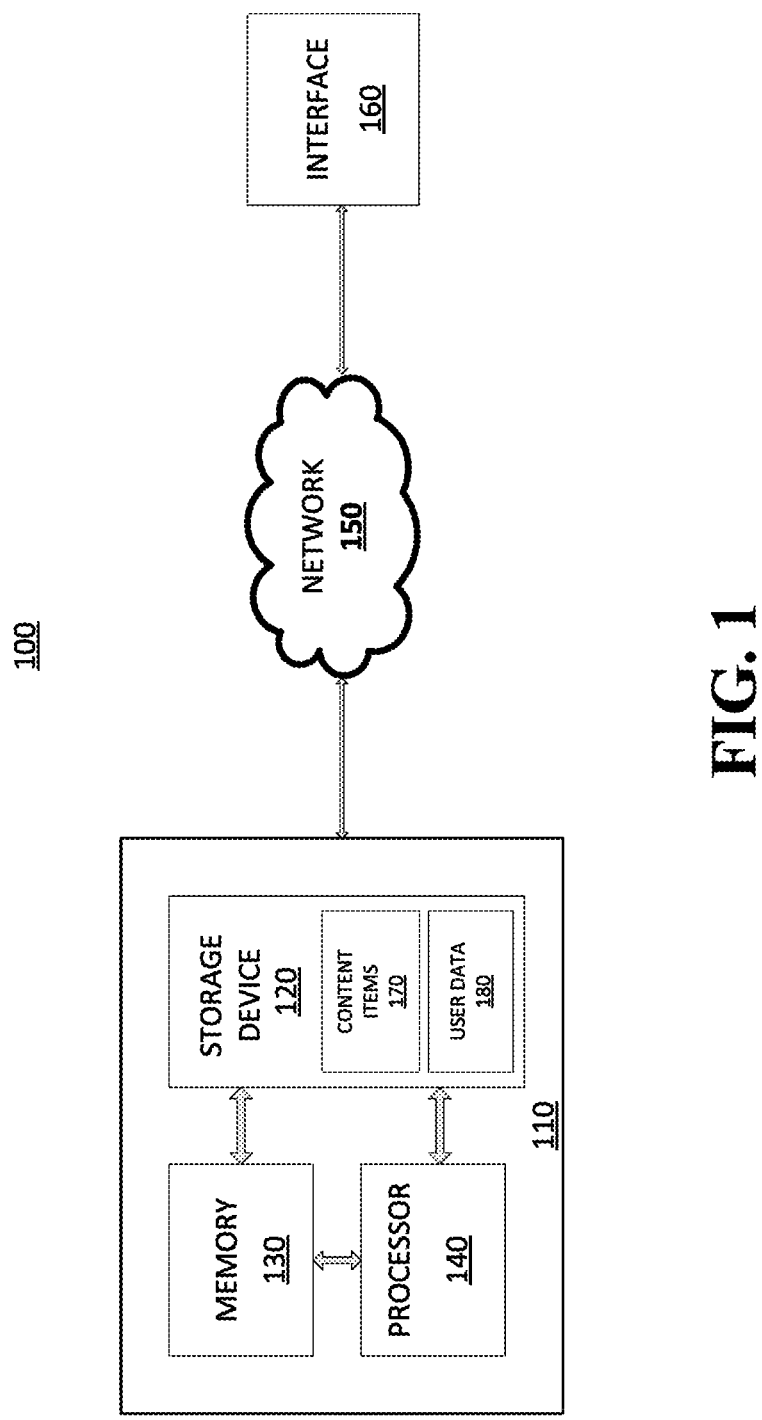
FIG. 1 shows an exemplary system according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Various short-comings are present within existing systems for recommending and providing downloadable content items to a plurality of users. For example, in a typical online store system for selling/distributing downloadable applications (hereinafter, "apps"), a user may download an app and receive recommendations from the system regarding other apps which might be of interest the user. However, the recommendations are typically grouped into clusters according to certain criteria, e.g., by categories, by developer, etc. Similarly, an online system providing media content will make recommendations to users based on criteria clusters, e.g., by recommending media content in the same genre or created by the same artists, etc. Recommending apps in criteria clusters fails to produce recommendations which work together as a full solution to match the user's different, varying and unique interests or account for the user's present circumstances.

The subject matter disclosed herein provides various features including recommendations of bundles of content items that work together across categorical boundaries to address a user's situation and have very little overlapping functionalities. As disclosed herein, content items may be recommended based on data tags and/or the probability of a user having downloaded app pairs. In this manner many benefits may be obtained for the user. In one example, by storing data tag information related to users of the system, as well as data tag information related to the content items, it is possible to make recommendations based on a change in a user's circumstances as indicated by the user's data tags.

FIG. 1 provides a conceptual diagram of a system 100 which may be used to recommend content items in accordance with an exemplary embodiment of the present disclosure. System 100 includes a server 110 including a storage device 120, a memory 130, and a processor 140. Server 110 is connected to a network 150 and is accessible to users via an interface 160. Network 150 may be any suitable network for transmitting data, for example, a local area network, a wide area network, the Internet, etc.

As is readily understood in the art, server 110 and interface 160 may each be implemented by any suitable computing device and/or plurality of computer devices. For example, in one embodiment interface 160 may be implemented using a mobile computing device, such as a laptop, tablet, mobile phone, smartphone, personal data assistant, portable gaming system, digital media player, etc., while server 110 may be implemented as one or more computers functioning as a mass storage unit.

Regarding server 110, storage device 120 may be implemented, for example, as one or more hardware storage devices such as a hard drive, flash memory drive or other memory storage circuit. Accordingly, system 100 may store a plurality of content items 170 in the storage device 120 of server 110. Content items 170 may be, for example, digital media files, executable apps, programs, etc.

A user of system 100 may access the plurality of content items 170 via network 150 using interface 140. The user may maintain a user account, stored as user data 180 in the system 100. User data 180 may include basic identification information data including name, phone number, address, email address, etc., as well as historical information data such as items 170 viewed, items 170 downloaded, items 170 purchased, ads presented, recommendations provided, conversion ratio, etc., in line with an established privacy policy.

Memory 130 may be implemented using hardware, read-only memory (ROM), random access memory (RAM), storage circuitry such as registers, and/or software memory structures or any combination thereof. Memory 130 may store a plurality of executable components used to operate system 100.

Figure 2:
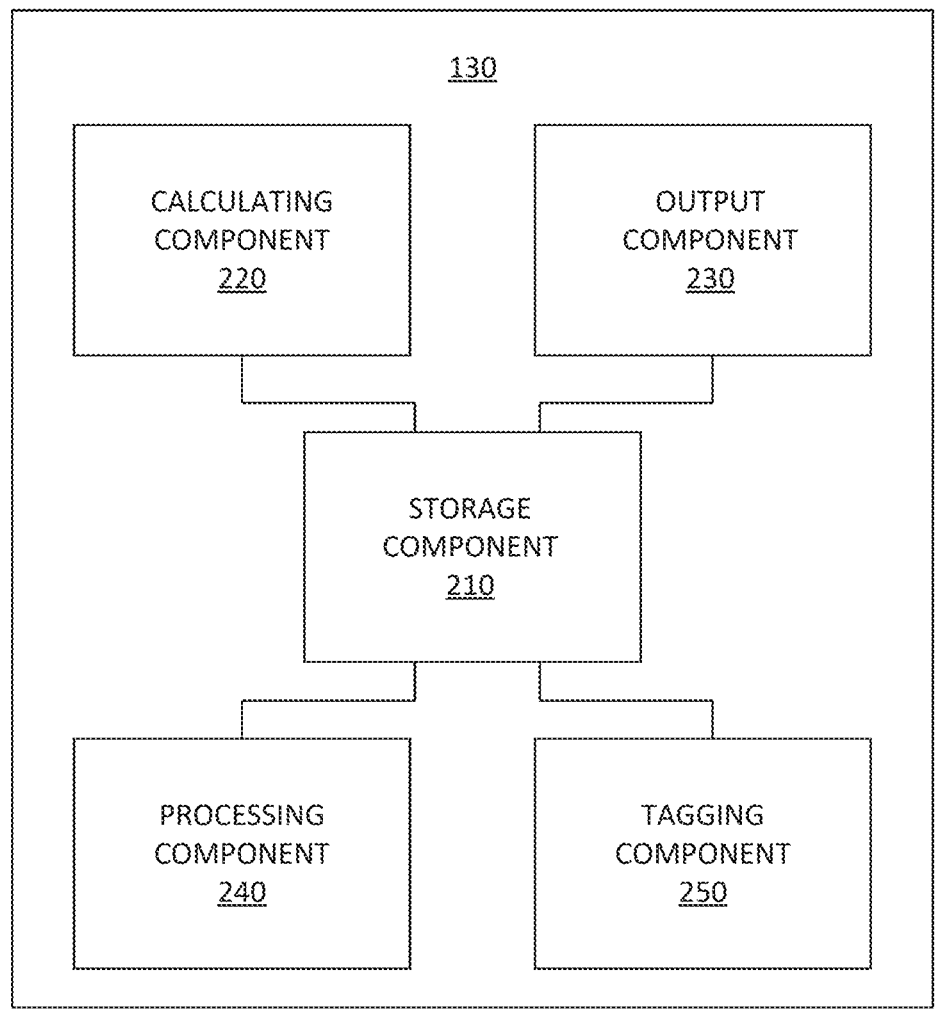
FIG. 2 shows an exemplary memory device according to an embodiment of the disclosed subject matter.

FIG. 2 illustrates one exemplary embodiment of memory 130, including a storage component 210, a calculating component 220, an output component 230, a processing component 240, and a tagging component 250. A person of ordinary skill in the art would appreciate that these various components may be implemented using software and/or electrical circuit(s) that can include circuitry elements of suitable function in order to implement the embodiments described herein. Furthermore, it can be appreciated that many of the various components can be implemented on one or more integrated circuit (IC) chips.

Storage component 210 may be configured to manage storage of a plurality of content items (apps) and storage of user data stored within the storage device 120 (FIG. 1).

Tagging component 220 may be configured to "tag" content items 170 and user accounts. Tagging herein refers to storing an association of a first item of data with a second item of data. For example, the first item of data could be a type of descriptive information data, e.g., language, region, location, price, or entity data, and the second item of data could be content item data, e.g., a music file or an app. Hereinafter, the first item of data in a tagging operation will be referred to as a tag, and the second item of data will be referred to as a subject.

The foregoing features will be understood more clearly in view of an exemplary embodiment, which will be described as follows, in which the system 100 is implemented as an online app store. It should be understood that this is merely one exemplary embodiment presented for illustrative purposes only and that system 100 may be implemented in any of multiple other ways that involve presenting individualized content for users in a given system, for example, as a network music store, an online news/article/review site, a product sampling site, an art store, etc.

In the exemplary system 100 which functions as an online app store, user data 180 includes user (customer) account information and the users' respective historical app viewing/installing data, and the content items 170 include the apps available to the users via the store. Regarding the tagging of data, user accounts and apps may both be subjects which are tagged by the same set of tags.

For each app A, the calculating component 220 may determine a corresponding app quality score $s_A$. The app quality score $s_A$ may be based on the collective user data 180 and indicate an overall quality of the app. The app quality score $s_A$ can be a function of, but not limited to, one or more of the following factors regarding the app: a number of user installations of the app, an uninstall ratio, a number of rating, an average of ratings, a developer credit, and/or raciness. For example, a higher number of ratings or a higher average may result in a higher app quality score $s_A$.

The calculating component 220 may further determine a co-install score $s_{(A,B)}$ for each pair of apps (A, B) among a plurality of apps stored within the system 100. The co-install score $s_{(A,B)}$ may be determined in any number of ways. Essentially, the co-install score $s_{(A,B)}$ should indicate a likelihood that a given pair of apps are installed by the same user. For example, the co-install score $s_{(A,B)}$ between two apps (A, B) may be determined based on mutual information as follows:

$$s_{(A,B)} = \Sigma_{a \in \{A, !A\}} \Sigma_{b \in \{B, !B\}} P(a,b) \log(P(a,b)/(P(a)P(b))) \quad [\text{Eq. 1}]$$

where A means a first app has been installed by a user, !A means the first app has not been installed by a user, B means a second app has been installed by a user, !B means the second app has not been installed by a user, and P(•) are probabilities approximated based on the user installation data, where the probabilities may be approximated by counting the installations and co-installations over all users.

Based on the co-install score, the system 100 may determine graphs (sets) and sub-sets of apps among the plurality of apps stored in the system 100. The graphs may be determined or defined based on relationships between apps based on the co-install scores, i.e., a set of apps may be defined as pairs of apps which each have a co-score of at least a minimal value. Such a set may be referred to as a co-install graph. For example, a co-install graph G={V, E} may be defined as a graph with vertices V and undirected edges E, wherein each vertex v∈V represents an app and is associated with app tags and a quality score $s_v$ as discussed above. In this example, each edge e=(v1, v2)∈E connects two vertices (apps) v1 and v2 and is associated with the co-install score $s_e$.

The size of the co-install graph as just described may be controlled by adjusting parameters and/or setting threshold requirements. For example, the system 100 may be configured such that no edge will be added between two apps if the co-install score of the two apps is below a threshold value.

Figure 7:
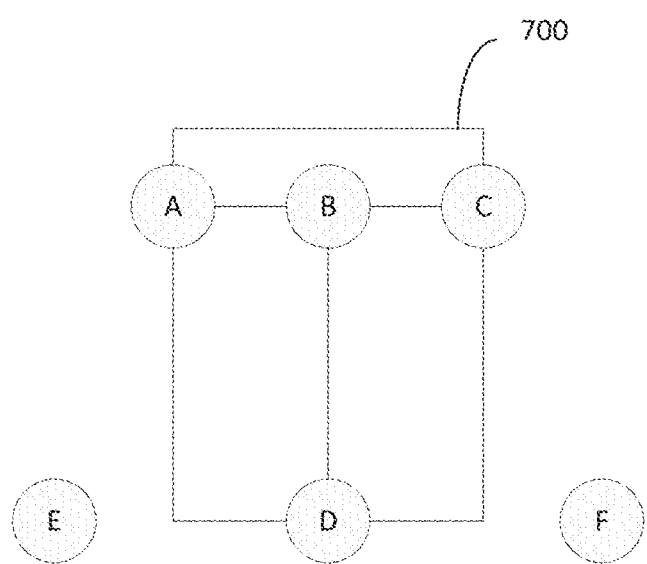
FIG. 7 shows an example simple undirected complete graph.

A complete graph among the plurality of apps may be defined as a simple undirected graph in which every pair of distinct vertices is connected by a unique edge. FIG. 7 illustrates an exemplary simple undirected graph 700 among a plurality of vertices (apps) A-F. Complete graph 700 includes four vertices (apps) A, B, C, and D, each connected by a unique edge. The system 100 may provide a complete subgraph of the co-install graph as a recommended subset (bundle) of apps to the user. Given a set of data tags, a tag-set subgraph may be defined as a subgraph of the con-install graph such that each app in the subgraph contains one or more tags in the given set of tags.

A graph quality score Q(G) may be defined to measure the quality of a complete graph of apps. In other words, the graph quality score Q(G) provides a metric to determine the overall quality of the complete graph recommendation of a bundle of apps. For example, a high quality complete graph may contain vertices of high app quality scores on average and edges of high co-install scores on average. An exemplary definition of Q(G) is:

$$Q(G=\{V,E\})=\Sigma_{v \in V} s_v / |V| + \alpha \Sigma_{e \in E} s_e / |E| + \beta |V| \qquad [\text{Eq. 2}]$$

Where α and β are tunable parameters, i.e., a large α gives preference in the score to a large number of edges and a large β gives preference to a large graph.

Accordingly, various algorithms may be used to generate complete subgraphs which satisfy different problems. For example, a maximum N-complete subgraph problem could be defined as a problem to find a complete subgraph G with at most N vertices (apps) from the original graph of the plurality of apps such that the subgraph G has a maximum quality score Q(G). However, a complete optimal solution to this problem may be prohibitively expensive to find and implement. In this case, a sub-optimal solution may be used, for example, processing component 240 may execute the following algorithm:

Algorithm I.
1. Let G = {V , E} be the original graph;
2. r = 0;
3. k = 0, $G_k$= ϕ
4. Let C($G_k$) = {v ∈ V/$G_k$|$G_k$ + v is complete} , and C(ϕ) = V.
If C($G_k$) = ϕ , go to step 10;
5. ∀ v ∈ C($G_k$) , compute a weight w(v) = $s_v$ + α$\Sigma_{e \in E_v} s_e$ + β |$E_v$|
where $E_v$ = {e ∈ E|v is a vertex of e};
6. Choose a v from C($G_k$) by weight sampling, using w(v) as weight;
7. $G_{k+1}$ = $G_k$ + v;
8. k ← k + 1;
9. Go to step 4 until k = N;
10. r ← r + 1;
11. Let Gr = Gk;
12. Go to step 3 until r = R;
13. Return Gr that has the largest Q(Gr), r = 1 : R.

Let $V_f$ be a fixed set of vertices in G. Let $G(V_f)$ be the subgraph of G after removing all of its vertices that are not in $V_f$. Suppose that $G(V_f)$ is a complete subgraph. A maximum N-complete F-subgraph may be defined similar to the maximum N-complete subgraph problem described above, except that the found complete subgraph must contain $G(V_f)$. Several solutions exist for the F-subgraph. One, for example, would be Algorithm I, with the following change to step 3:

$$k=0, G_k=G(V_f); \qquad 3.$$

In this case, if $G(V_f)$ is not a complete subgraph, the system 100 may first find a maximum N-complete subgraph from $G(V_f)$ and then apply the maximum N-complete F-subgraph algorithm.

The system 100 may thereby recommend a bundle of applications to a user via the output component 230 in any of various scenarios, taking into account different factors. For example, the apps and the user account may both have respective associated data tags of the same set. An exemplary tag set which will be referred to is the "entity" data tag. Herein, an entity is a thing or concept which exists in the world and is represented by a unique ID. An entity ID may be independent of language restrictions or categorical limitations. For example, using the established Freebase entity system, a social networking app could be tagged with "entity:/m/01w362" (social network) and/or "entity:/m/0fj7z" (instant messaging), etc.

Both the user account and the stored apps may be tagged with entity data tags. In addition, user accounts may be tagged with long term data applicable to the user, such as demographic data, gender data, identification (name, phone number, address, email address), etc. Long term user data may be received, for example, from the setting up a user profile.

Based on the entity data tags, the system 100 can recommend a bundle of apps. For example, in one exemplary embodiment if the user experiences a change (e.g., travel to a new location, pregnant, looking for a house, etc.) the user account tags may be updated with corresponding entity data to reflect the change. In other words, in contrast to long term user data, short term user data tags may be created based on recent actions of the user. For example, if the user recently issues many search queries about housing, the user may be tagged with instant tags "entity:/m/0bp7qzc" (house buying), "entity:/m/023907r" (Real Estate), etc. If the user travels to a new location Tokyo, the user may be tagged with an instant tag "entity:/m/07dfk" (Tokyo). The system 100 may accordingly recommend a bundle of apps in response to the change, as illustrated in the flowchart of FIG. 3.

Figure 3:
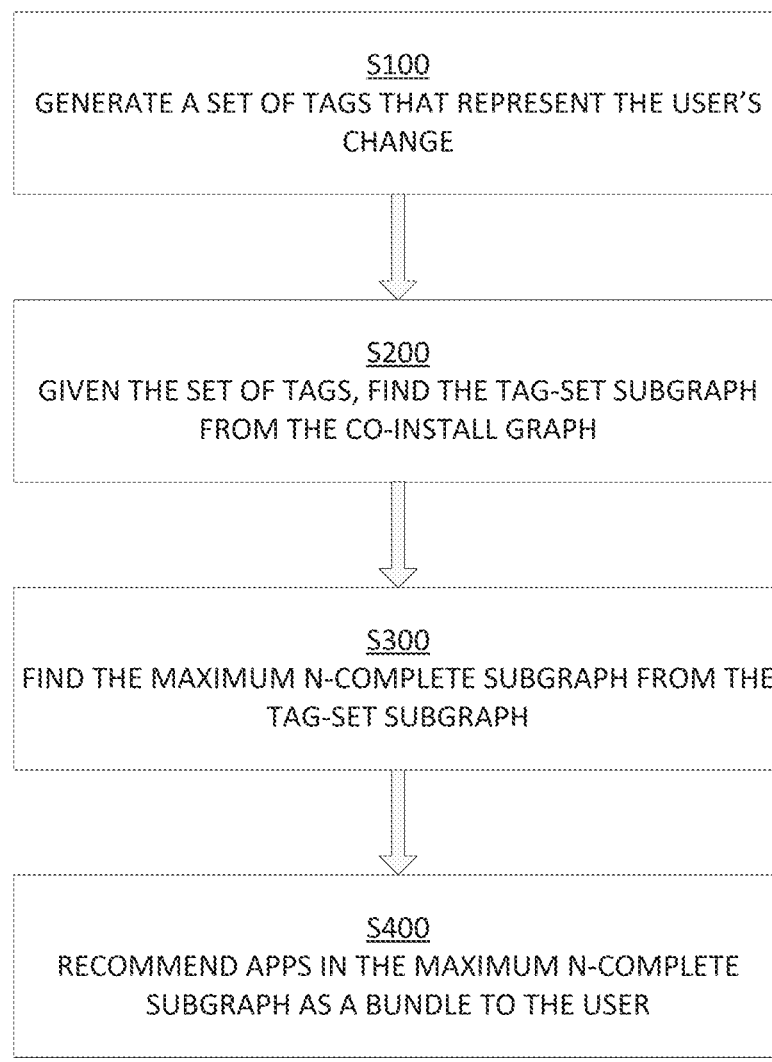
FIG. 3 shows a flowchart of providing a recommendation of apps as a bundle to the user according to an embodiment of the disclosed subject matter.

Referring to FIGS. 1-3, the tagging component 250 tags a plurality of apps 170 and user data 180 stored in the storage device. At operation S100, the system 100 may generate a set of tags that represent a user's interest and the basis of the recommendation, e.g., a user's changed status. In the case of a user change, the tag update may be handled automatically based on detected changes in user data 180 or manually, via the user inputting information to update the user's status via interface 160.

At operation S200, the calculating component may determine a co-install score for the plurality of apps 170, and the processing component 240 may determine a co-install graph from the plurality of apps 170 based on the co-install score. The processing component may determine a tag-set subgraph from the co-install graph based on the tag-set generated in operation S100.

At operation S300, the processing component may determine a maximum N-complete subgraph from the tag-set subgraph, for example, using Algorithm I or another algorithm, where N is a number of apps.

At operation S400 the output component outputs the recommendation of apps in the maximum N-complete subgraph as a bundle to the user.

In another exemplary embodiment, if a user has an existing set of apps, the system may recommend an additional set of apps that complement the existing set of apps in a similar manner as the process illustrated in FIG. 3, except that operation S300 would comprise determining the maximum N-complete F-subgraph from the tag-set subgraph and operation S400 would accordingly comprise recommending apps in the maximum N-complete F-subgraph (after removing the already installed apps) as a bundle to the user.

The above-described exemplary embodiments apply system 100 to an app store for illustrative purposes, but a person of ordinary skill in the art can readily apply the system 100 to other types of content item systems, including, but not limited to, a music store, an article/news site, a product sampling site, etc. For example, in general terms, as described above, the system 100 may store a plurality of content items in a computer system, determine a respective co-selection score for each pair of content items among the plurality of content items, the co-selection score indicating a probability that a given pair of content items among the plurality of content items will both be downloaded by a user of the computer system, and output, to a first user, a plurality of content items comprising a sub-set of the plurality of content items, the sub-set being selected to correspond to a graph having vertices each connected by unique edges. Each vertex may correspond to a content item and each unique edge may correspond to a co-selection score greater than a predetermined threshold value.

The system 100 may further determine respective quality scores for each of the plurality of content items and select the sub-set to have a graph quality score which is greater than a predetermined threshold value. The graph quality score may be based on an average quality score of the sub-set content items and an average co-install score of the sub-set content item pairs.

The sub-set may be further selected to have a graph quality score that is an approximate maximum possible value for a predetermined number of content items.

The system 100 may further store installation data corresponding to statistics of content item installations made by a plurality of users of the system 100. The co-selection scores may further be determined based on the installation data.

The system 100 may associate one or more data tags with each of the plurality of content items. The sub-set may further be selected such that each of the sub-set content items are associated with one or more data tags of a predetermined set of one or more data tags.

The system 100 may associate one or more data tags with user data for each of a plurality of users of the computer system. In this case, the predetermined set of one or more data tags may comprise the one or more data tags which are associated with a given user.

The system 100 may output the recommended bundle to the user when there is a change in the data tags associated with the given user's user data.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 4:
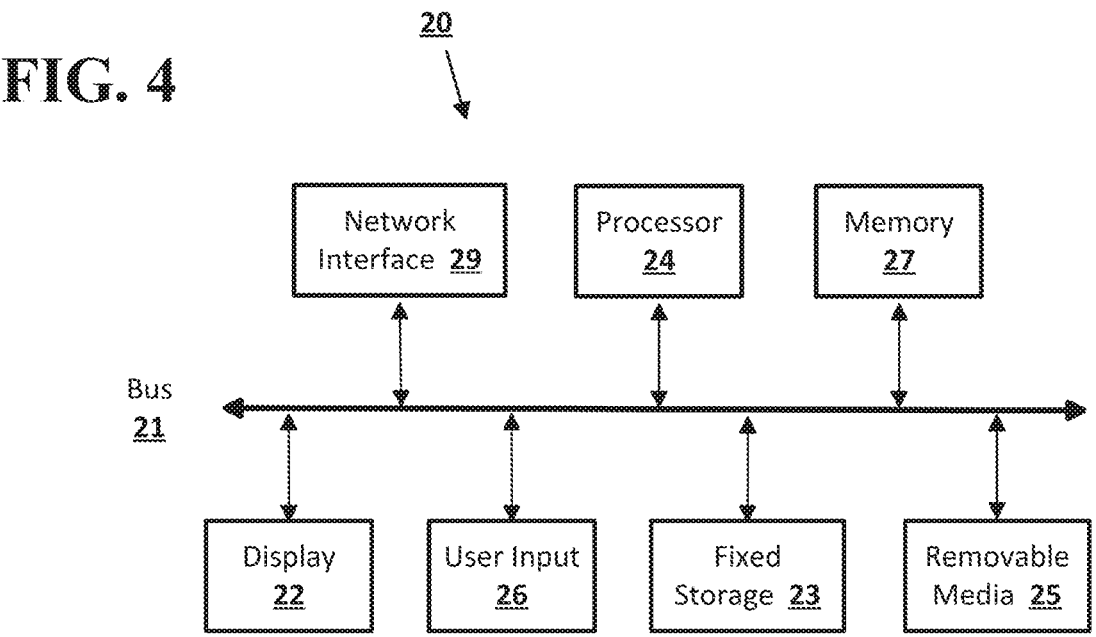
FIG. 4 shows a computing device according to an embodiment of the disclosed subject matter.

Embodiments of the presently disclosed subject matter may be implemented in and used with a variety of component and network architectures. FIG. 4 is an example computing device 20 suitable for implementing interface 160 or server 110 in embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
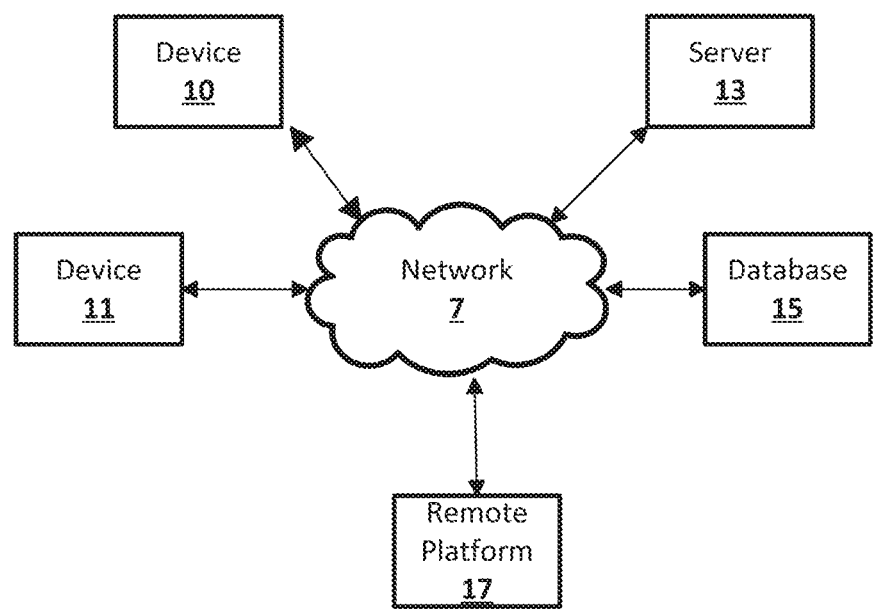
FIG. 5 shows a network configuration according to an embodiment of the disclosed subject matter.

FIG. 5 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 6:
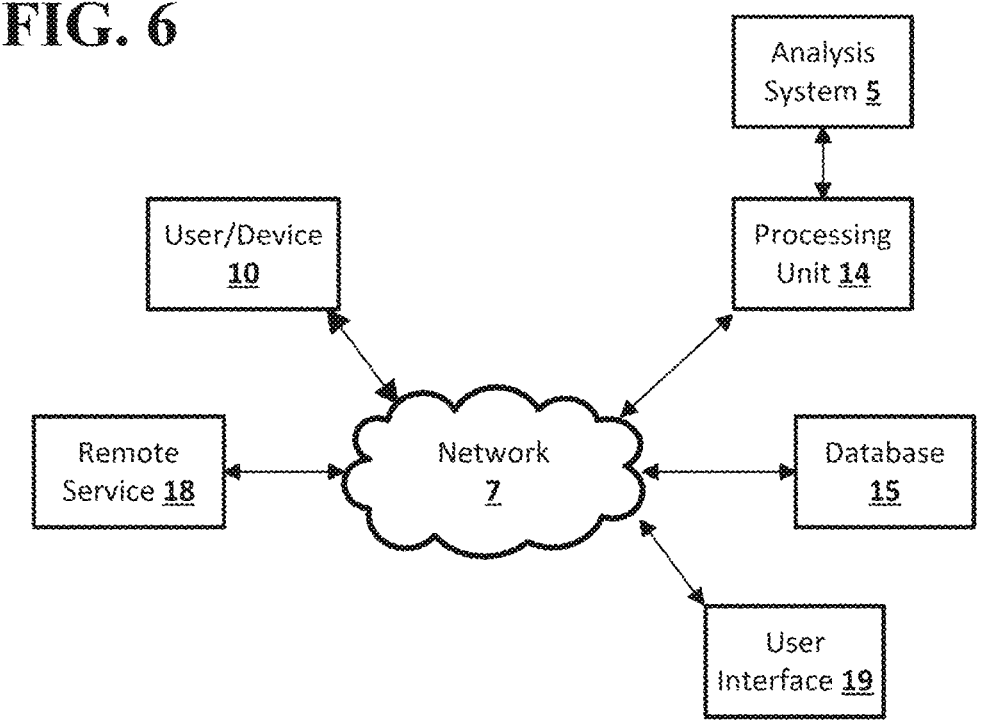
FIG. 6 shows an example network and system configuration according to an embodiment of the disclosed subject matter

FIG. 6 shows another example arrangement according to an embodiment of the disclosed subject matter. One or more devices or systems/user devices 10 such as local computers, smart phones, tablet computing devices, remote services/ service providers 18, and the like, may connect to other devices via one or more networks 7. The network may be a local network, wide-area network, the Internet, or any other suitable communication network or networks, and may be implemented on any suitable platform including wired and/ or wireless networks. The devices 10, 11 may communicate with one or more remote computer systems, such as processing units 14, databases 15, and user interface systems 19. In some cases, the devices 10, 11 may communicate with a user-facing interface system 19, which may provide access to one or more other systems such as a database 15, a processing unit 14, or the like. For example, the user interface 13 may be a user-accessible web page that provides data from one or more other computer systems. The user interface 19 may provide different interfaces to different clients, such as where a human-readable web page is provided to a web browser client on a user device 10, and a computer-readable API or other interface is provided to a remote service client 11.

The user interface 19, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 19. For example, a machine learning system 5 may provide various prediction models, data analysis, or the like to one or more other systems 19, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method, comprising:
storing a plurality of content items in a computer system;
determining a respective co-selection score for each pair of content items among the plurality of content items, the co-selection score indicating a probability that a given pair of content items among the plurality of content items will both be downloaded by a user of the computer system;
associating one or more data tags with each of the plurality of content items;
associating one or more data tags with user data for each of a plurality of users of the computer system;
outputting, to a first user, a recommendation including a sub-set of the plurality of content items, the sub-set being selected to correspond to a graph having vertices each connected by unique edges, wherein each vertex corresponds to a content item and each unique edge corresponds to a co-selection score greater than a predetermined threshold value, and wherein the sub-set is further selected such that each of the sub-set of content items are associated with one or more data tags of a predetermined set of one or more data tags, and the predetermined set of one or more data tags comprises the one or more data tags which are associated with a given user.

2. The method of claim 1, further comprising:
determining respective quality scores for each of the plurality of content items; and
selecting the sub-set to have a graph quality score which is greater than a predetermined threshold value, the graph quality score being based on an average quality score of the sub-set content items and an average co-install score of the sub-set content item pairs.

3. The method of claim 2, wherein the sub-set is further selected to have a graph quality score that is an approximate maximum possible value for a predetermined number of content items.

4. The method of claim 2, wherein the content items correspond to installable applications which may be downloaded by a plurality of users, and wherein the quality scores are determined based on at least one factor selected from the group consisting of: a number of times the application has been installed by a plurality of users, a number of times the application has been uninstalled by the plurality of users, an average user rating of the application, a number of users that have rated the application, and a rating of a developer who created the application.

5. The method of claim 1, further comprising:
storing installation data corresponding to statistics of content item installations made by a plurality of users of the computer system,
wherein the co-selection scores are further determined based on the installation data.

6. The method of claim 5, wherein the co-selection scores for each pair (A,B) of content items are further determined based on mutual information as follows:

$$s_{(A,B)} = \Sigma_{a \in \{A, !A\}} \Sigma_{b \in \{B, !B\}} P(a,b) \log(P(a,b)/(P(a)P(b)))$$

where A means a first content item has been installed by a user, !A means the first content item has not been installed by a user, B means a second content item has been installed by a user, !B means the second content item has not been installed by a user, and P(•) are probabilities approximated based on the installation data.

7. The method of claim 1, wherein the output is provided to the user when there is a change in the data tags associated with the given user's user data.

8. The method of claim 1, further comprising:
storing first data tags associated with demographic user data for each of a plurality of users of the computer system,
wherein the sub-set is further selected such that each sub-set content item is associated with a same first data tag.

9. The method of claim 1, wherein the output is provided to the user when the user selects one of the content items through an interface of the computer system.

10. A system, comprising:
a storage device; a memory that stores computer executable components; and
a processor that executes the following computer executable components stored in the memory:
a storage component that stores a plurality of content items in the storage device;
a calculating component that determines a respective co-selection score for each pair of content items among the stored plurality of content items, the co-selection score indicating a probability that a given pair of content items among the plurality of content items will both be downloaded by a user of the system;
an output component that outputs, to a first user, a recommendation including a sub-set of the stored plurality of content items;
a tagging component to associate one or more data tags with each of the plurality of content items and associate one or more data tags with user data for each of the plurality of users; and
a processing component that selects the sub-set such that the sub-set corresponds to a graph having vertices each connected by unique edges, wherein each vertex corresponds to a content item and each unique edge corresponds to a co-selection score greater than a predetermined threshold value,
wherein the processing component further selects the sub-set such that each of the sub-set of content items are associated with one or more data tags of a predetermined set of one or more data tags, and the predetermined set of one or more data tags comprises one or more data tags which are associated with a given user.

11. The system of claim 10, wherein the calculating component further determines respective quality scores for each of the plurality of content items, and
wherein the processing component further selects the sub-set to have a graph quality score which is greater than a predetermined threshold value, the graph quality score being based on an average quality score of the sub-set content items and an average co-selection score of the sub-set content item pairs.

12. The system of claim 11, wherein the processing component further selects the sub-set to have a graph quality score that is an approximate maximum possible value for a predetermined number of content items.

13. The system of claim 11, wherein the content items correspond to installable applications which may be downloaded from the system by a plurality of users, and
the calculating component further determines the quality scores based on at least one factor selected from the group consisting of: a number of times an application has been installed by the users, a number of times the application has been uninstalled by the users, an average rating of the application by the users, a number of users that have rated the application, and a rating of a developer who created the application.

14. The system of claim 10, wherein the storage component stores in the storage device download data corresponding to statistics of content items downloaded by a plurality of users, and
wherein the scoring component further determines the co-selection scores based on the download data.

15. The system of claim 10, wherein the storage component stores in the storage device first data tags associated with demographic user data for each of the plurality of users, and
wherein the processing component further selects the sub-set such that each sub-set content item is associated with a first data tag.

16. The system of claim 10, wherein the output is provided to the user when there is a change in the data tags associated with the given user's user data.

17. A non-transitory computer readable medium storing a program causing a computer to execute a computer-implemented method, comprising:
- storing a plurality of content items in a computer system;
- determining a respective co-selection score for each pair of content items among the plurality of content items, the co-selection score indicating a probability that a given pair of content items among the plurality of content items will both be downloaded by a user of the computer system;
- associating one or more data tags with each of the plurality of content items;
- associating one or more data tags with user data for each of a plurality of users of the computer system;
- outputting, to a first user, a recommendation including a sub-set of the plurality of content items, the sub-set being selected to correspond to a graph having vertices each connected by unique edges, wherein each vertex corresponds to a content item and each unique edge corresponds to a co-selection score greater than a predetermined threshold value, and
- wherein the sub-set is further selected such that each of the sub-set of content items are associated with one or more data tags of a predetermined set of one or more data tags, and the predetermined set of one or more data tags comprises the one or more data tags which are associated with a given user.

18. The non-transitory computer readable medium of claim 17, the computer-implemented method further comprising:
- determining respective quality scores for each of the plurality of content items; and
- selecting the sub-set to have a graph quality score which is greater than a predetermined threshold value, the graph quality score being based on an average quality score of the sub-set content items and an average co-install score of the sub-set content item pairs.

19. The method of claim 18, wherein the sub-set is further selected to have a graph quality score that is an approximate maximum possible value for a predetermined number of content items.

20. The method of claim 18, wherein the content items correspond to installable applications which may be downloaded by a plurality of users, and wherein the quality scores are determined based on at least one factor selected from the group consisting of: a number of times the application has been installed by a plurality of users, a number of times the application has been uninstalled by the plurality of users, an average user rating of the application, a number of users that have rated the application, and a rating of a developer who created the application.

* * * * *